United States Patent [19]
Yukino

[11] Patent Number: 5,268,770
[45] Date of Patent: Dec. 7, 1993

[54] SYSTEM AND A METHOD FOR FACSIMILE TRANSMISSION

[75] Inventor: Kensaku Yukino, Tokyo, Japan

[73] Assignee: Media Interface Co., Ltd., Tokyo, Japan

[21] Appl. No.: 465,283

[22] Filed: Jan. 16, 1990

[51] Int. Cl.⁵ ............................................. H04N 1/32
[52] U.S. Cl. ........................... 358/435; 358/436; 358/442; 358/443
[58] Field of Search ............. 358/434, 435, 436, 438, 358/439, 470, 402, 403, 406, 444; 395/102, 110, 114; 379/100

[56] References Cited

U.S. PATENT DOCUMENTS

| | | | |
|---|---|---|---|
| 4,321,626 | 3/1982 | Wada | 358/470 |
| 4,581,656 | 4/1986 | Wada | 379/100 |
| 4,772,955 | 9/1988 | Kurahayashi et al. | 358/434 |
| 4,829,385 | 5/1989 | Takezawa | 358/470 |
| 4,965,676 | 10/1990 | Ejiri et al. | 358/406 |
| 5,001,571 | 3/1991 | Murano | 358/434 |

FOREIGN PATENT DOCUMENTS 0246153 12/1985 Japan ............................. 358/444

*Primary Examiner*—Edward L. Coles, Sr.
*Assistant Examiner*—Scott A. Rogers
*Attorney, Agent, or Firm*—Lowe, Price, LeBlanc & Becker

[57] ABSTRACT

A facsimile system having a transmitting function in facsimile communication which comprises a first means for inputting external document data in the form of electrical signals as a printer output file, a storage means for storing the external document data inputted by the first means and a second means for transmitting the external document data stored in the storage means to a predetermined destination by way of a communication line in accordance with a protocol of facsimile transmission.

7 Claims, 13 Drawing Sheets

SYSTEM AND A METHOD FOR FACSIMILE TRANSMISSION

BACKGROUND OF THE INVENTION

1. Field of the Invention

This invention generally relates to a system and a method for facsimile transmission and more particularly to a system and a method for performing good quality facsimile transmission of document information at a high speed.

2. Description of the Prior Art

Conventionally, as means for telecommunication of document information, have been widely used telex, teletex, facsimile and personal computer to personal computer communication.

First, in case of using the telex, character information is inputted from a keyboard by typing thereof or from a paper tape reader by reading thereof preliminarily punched in the tape and then is transmitted in the form of a coded electrical signal. The telex, however, has the advantage that it cannot transmit image and graphic information except only character information. Further, the range of the character which can be transmitted by the telex is limited only to alphabets and some symbols. Data transfer rate of the telex is approximately 50 bits/-second (bps). Moreover, it costs almost 3500 yen to transmit information represented by 2000 characters corresponding to an (ISO) A4 size.

Next, the teletex is the combination of a word processor and a teletype and is used to send a document which is preliminarily created by the word processor at the data transfer rate of 2400 bps. Thus, the transfer rate of the teletex is higher than that of the telex by a factor of about 50 times, and on the other hand the communication cost of the former is about a tenth that of the latter, that is, considerably lower than that of the latter. Incidentally, in Japan, has been developed a practical Japanese language teletex which can deal with kana data in addition to alphabetical data.

Furthermore, the facsimile is the process by which a document (or graphic material) is optically scanned, and the information described in the document (hereunder sometimes referred to simply as document information) is then converted by using photoelectric conversion into time series electrical signals, and the electrical signals are transmitted by communication lines and finally the information is reproduced on a sheet of paper. By this facsimile, any document information can be transmitted because an image or picture described on a document can be transmitted without any modification thereof as can be understood from the foregoing description. In addition, to transmit the document information, an operator or user has only to set the document on a facsimile system and then dial an information destination and thus the facsimile system is very easy of operation.

Further, the personal computer to personal computer communication (hereunder sometimes referred to simply as personal computer communication) is the process of transmitting coded character information by using a personal computer or a word processor as a communication terminal. The data transfer rate of the personal computer communication is nearly equal to that of the teletex, and the communication cost of the personal computer communication is low. Additionally, by the personal computer communication, image or graphic data can be transmitted through the transfer time of such data is relatively long.

Incidentally, as to a facsimile system of Group 4 (hereunder sometimes referred to simply as a G4 facsimile system) of which the practical implementation is commenced, is prescribed a "mixed mode" in which the transmission of character codes and that of an image are combined with each other as functions of a "Class 3". Further, the structure of a document and a protocol for transmission of a document in this "mixed mode" are prescribed in Recommendation T.73 ("A Document Interchanging Protocol for Telematics Services") of International Consultative Committee in International Telegraphy and Telephony (CCITT).

As described above, in case of the communication by using the telex, the data transfer rate is low and in addition the communication cost is high. Further, in this case, the characters to be transmitted are limited only to alphabetic letters. In other words, image data and graphic data cannot be transmitted by the telex.

Further, the communication of character information has encountered problems that degradation (or blurring) of character information occurs, that an amount (or redundancy) of electrical information to be transmitted is large and that the transmission time is relatively long.

In case of the mixed mode of the G4 facsimile system, characters, pictures and graphic forms can be transmitted. It is, however, necessary to convert the form of the document information composed by an existing computer or word processor (hereunder sometimes referred to as a document composition system) into the standard form of the mixed mode in accordance with the CCITT Recommendation T.73.

Moreover, by the personal computer communication system, kanji data and image data can be transmitted. However, in case where only character data are transmitted, the data transfer rate is relatively large, though a somewhat complex procedure should be taken for operating the system. In addition, in case of employing a method of transmitting a file of software for a word processor, even data on detail layout of the file bits of modifying characters and an image are transmitted. However, there is no standard data format to be employed in software used in the system. Therefore, is necessary the standardization of software used in the transmitting portion and the receiving portion of the system.

Thus, as is seen from the foregoing description, there has been no communication system which can transmit kanji, picture and graphic data, and can realize a high-quality transmission of data at a high speed by performing a simple operation, and can save communication cost.

It is accordingly an object of the present invention to provide facsimile of CCITT Group 3, Group 4 and so forth which can realize high-speed, high-quality, low-cost and simple and easy document information communication by having a function of transmitting a printer output file to another one.

SUMMARY OF THE INVENTION

To achieve the foregoing object and in accordance with the present invention, there is provided facsimile of CCITT Group 3, Group 4 and so forth which has a function of transmitting a printer output file (hereunder sometimes referred to as a printer output file transmitting function) in addition to functions of transmitting and receiving document information. Thus, in accordance with the present invention, there is provided a facsimile system which includes means for transmitting a printer output file in addition to means for transmitting document information and means for receiving document information. Furthermore, in the facsimile of the present invention, a transmission control means has an expanded function in order to appropriately perform the printer output file transmitting function in conventional transmission control procedures. Thus, the facsimile system of the present invention of which the transmission control means has means for performing the expanded function.

Hereinafter, the printer output file transmitting function will be explained in detail.

(1) Printer Output File Transmitting Function

In a printer output file transmitting mode in which the printer output file function works, the facsimile system has functions of receiving printing data (that is, the printer output file) outputted from the document composition system to a printer and transmitting the received data without any change thereof instead of ordinary image information.

The printer output file includes control codes for line feed, carriage return, form feed and page ejection and so on in addition to character codes. In the control codes, are included other control codes used for indicating sizes of character such as double size of character, double height and width size of character and reduced size of character. Such character size indicating control codes may differ with control code systems of printers. Therefore, the control code system of the printer used by the document composition system should be based on one or more control code systems which have been widely used.

Incidentally, the above described control code systems of printers include not only ordinary control code systems of printers but also page description language (PDL) further abstracted.

That is, in accordance with a first aspect of the present invention, there is provided a facsimile system having a transmitting function in facsimile communication which comprises a first means for inputting external document data in the form of electrical signals as a printer output file, a storage means for storing the external document data inputted by the first means and a second means for transmitting the external document data stored in the storage means to a predetermined destination by way of a communication line in accordance with a protocol of facsimile transmission.

Further, to cope with the situation in which the destination facsimile system does not have a function of receiving the printer output file, the transmitting facsimile system need have a function (hereunder sometimes referred to as a printer output file to image conversion and transmission function) of converting the printer output file into image information at the transmitting portion and then transmitting the image information as ordinary facsimile signals for the purpose of maintaining compatibility with conventional facsimile systems.

That is, as a preferred embodiment of the present invention, there is provided a facsimile system which further includes a judging means for determining whether or not the destination facsimile system has a predetermined receiving function and whether or not the control code of the printer used by the destination facsimile system is in agreement with that of the printer thereof, a character font storing means for preliminarily storing character fonts, a conversion means for converting the printer output file into the image information by reading the character fonts from the character font storing means in accordance with the external document data stored in the storage means and performing printer emulation at the same time in case where as a result of the determination, it is concluded that the destination facsimile system does not the predetermined receiving function or that the control code of the printer of the destination facsimile system is not in agreement with that of the printer thereof, and a third means for transmitting the data converted into the image information to the destination facsimile system through the communication line in accordance with the protocol of the facsimile transmission.

Further, another expanded function, that is, a printer output file receiving function will be described in detail hereinbelow.

(2) The Printer Output File Receiving Function

In a printer output file receiving mode, the printer output file thus transmitted is converted into image information by emulating a printing operation of a printer by using software and outputting the image information as information in the form of a document equivalent to a document which would be printed if a printer is directly connected to the document composition system at the time of transmitting the printer output file.

In this case, is brought up the question what the control code system of a printer to be emulated is. Naturally, this control code system should be the same control code system as that used in the document composition system at the side of transmitting the printer output file.

In accordance with a second aspect of the present invention, there is provided a facsimile system having a function of receiving document information in facsimile communication which includes a character font storing means for preliminarily storing character fonts, a judging means for determining whether or not signals to be received from the predetermined destination facsimile system connected through a communication line thereto is document data as the printer output file, a signal receiving and storing means for receiving and storing the signals to be received if the signals to be received represent the document data as the printer output file, and a conversion means for converting the printer output file into the image information by reading the character fonts from the character font storing means in accordance with the stored document data and performing printer emulation at the same time.

The facsimile system of the present invention can be described above from the point of view that the functions of the facsimile is divided into the transmitting function and the receiving function. In contrast, if the transmitting and receiving functions are combined in a single method, there is provided a facsimile communication method which comprises steps of storing external document data in the form of electrical signals in a storage means In addition, if the printer output file to image information conversion and transmission function is added to the facsimile of the present invention, transmission of data to a conventional facsimile system having no function of receiving a printer output file can be easily performed. Thus, communication among facsimile systems can be secured without hindrance until the facsimile system having a printer output file transmitting function comes into wide use.

As to the data transfer rate, in comparison with the ordinary rate of 1200 bps in case of the personal computer communication, that of the facsimile system of the present invention is high (for example, that of the CCITT G3 facsimile system of the present invention is 9600 bps). In case where the same document data are transmitted to a plurality of terminals, the facsimile communication method of the present invention is very advantageous in comparison with the personal computer communication. Although there is a restriction that the use of the printer output file transmitting mode is limited to the document produced by the document composition system of which the control code of the printer is in agreement with that of the printer of the destination, it can be achieved that the data transfer rate of the facsimile of the present invention is about ten times that of the conventional facsimile and the as a printer output file, then transmitting the external document data to a predetermined destination in accordance with a protocol of facsimile transmission, and, in the destination, converting the external document data into image information by reading character fonts preliminarily stored in a character font storing means in accordance with the received external document data and by simultaneously performing printer emulation and then printing the image information.

As is apparent from the foregoing description, in case of the facsimile system or the facsimile communication method of the present invention, only by adding the function of inputting and transmitting the printer output file to the conventional facsimile system, a widespread facsimile network can be used and further document data can be transmitted by performing a simple operation as character codes. That is, the document data produced by the document composition system can be easily transmitted and received by performing an operation simpler than of the conventional personal computer communication. Furthermore, the facsimile system of the present invention has an advantage that an extremely large number of terminals can be communicated therewith. Moreover, various functions such as a broadcasting function and an interchanging function of the facsimile are available. transmission performance of the facsimile of the present invention is high.

Incidentally, there are many points in common between the facsimile of the present invention and a mixed mode of the facsimile employing CCITT Group 4 standards. The facsimile of the present invention has the great advantage of being capable of transmitting document data produced by an exsisting document composition system without format conversion, in comparison with the mixed mode of the facsimile employing CCITT Group 4 standards.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF A PREFERRED EMBODIMENT

Hereinafter, a preferred embodiment of the present invention will be described in detail by referring to the accompanying drawings.

Generally, the facsimile system has both of the functions of transmitting data and of receiving data. It, however, goes without saying that the facsimile system may have only one of the transmitting and receiving functions, as necessary. The preferred embodiment, which will be explained hereinbelow, has both of the functions transmitting and receiving data and is constructed and operates in conformity with the CCITT Group 3 standards.

Figure 1:
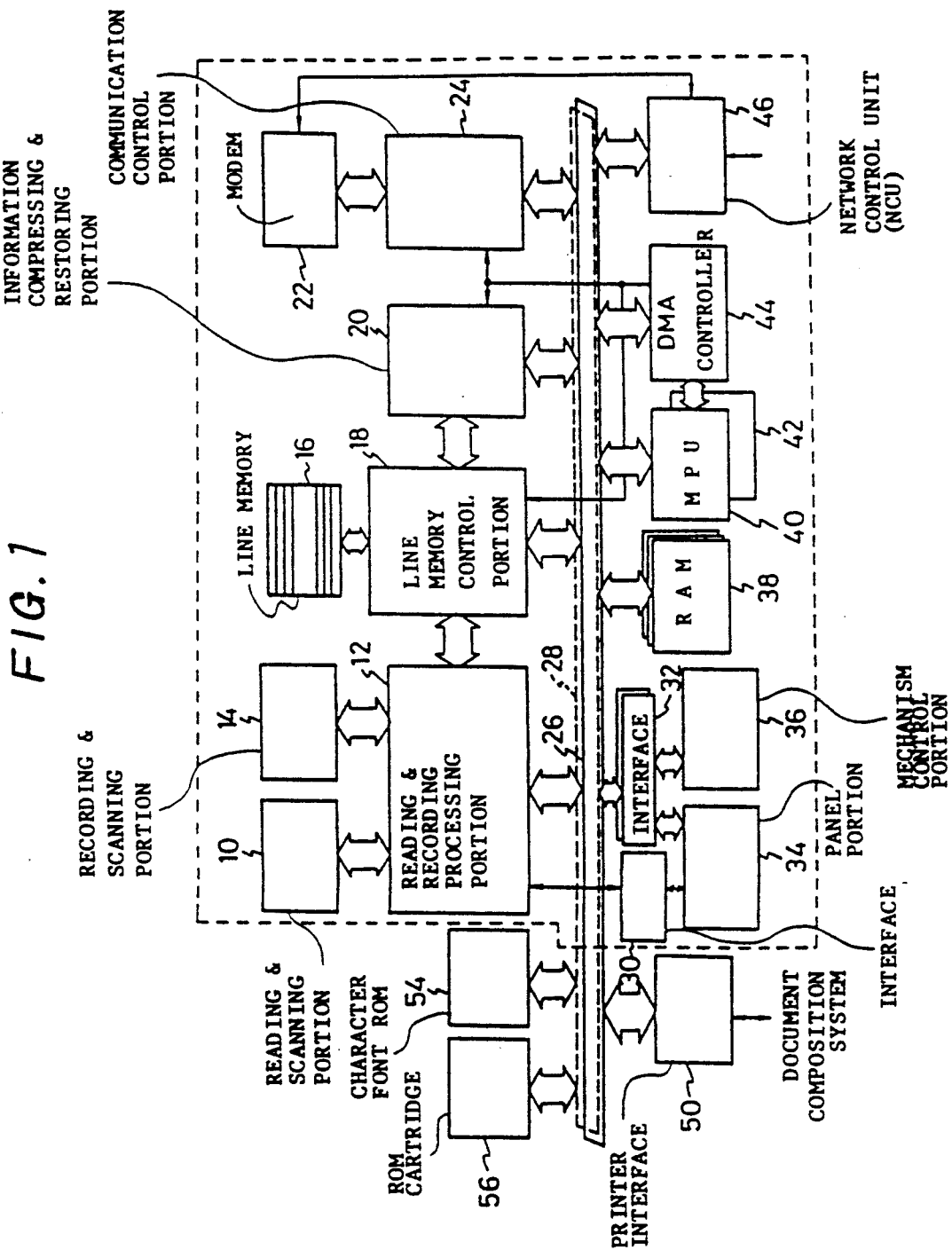
FIG. 1 is a schematic block diagram for showing the construction of the facsimile system embodying the present invention.

Referring now to FIG. 1, there is shown a facsimile system embodying the present invention. In this figure, portions enclosed by dashed lines, that is, a reading and scanning portion 10 to a network control unit (NCU) 46 are similar to corresponding portions of a conventional facsimile system which meets the CCITT Group 3 standards. Incidentally, a program stored in a read-only-memory (ROM) 42 for controlling an operation of a microprocessor unit (MPU) 40 is partially different from a corresponding program used in the conventional facsimile system.

In the facsimile system of the present invention, in addition to parts of the conventional facsimile system, there are provided a printer interface 50, a ROM 56 for storing a program for printer emulation processing and a ROM 54 which serves as a character font storing means for storing predetermined character fonts. A parallel port, which meets Centronics standards, may be used as the printer interface 50 and can input a printer output file in the form of electrical signals produced by a computer or a word processor. Such a printer interface 50 is provided in the facsimile system in order that the facsimile system receives printing data outputted to a printer for the printer. The ROM 56 is formed as a cartridge and is used for emulating a printing operation of the printer and outputting the image of document information. In order to facilitate modification of and addition to a printer control code system, a predetermined printer emulation program is stored and set in the ROM cartridge 56. The ROM 54 for storing the character fonts is necessary when the emulation program outputs a character pattern, based on the character codes of the printer output file.

Figure 2:
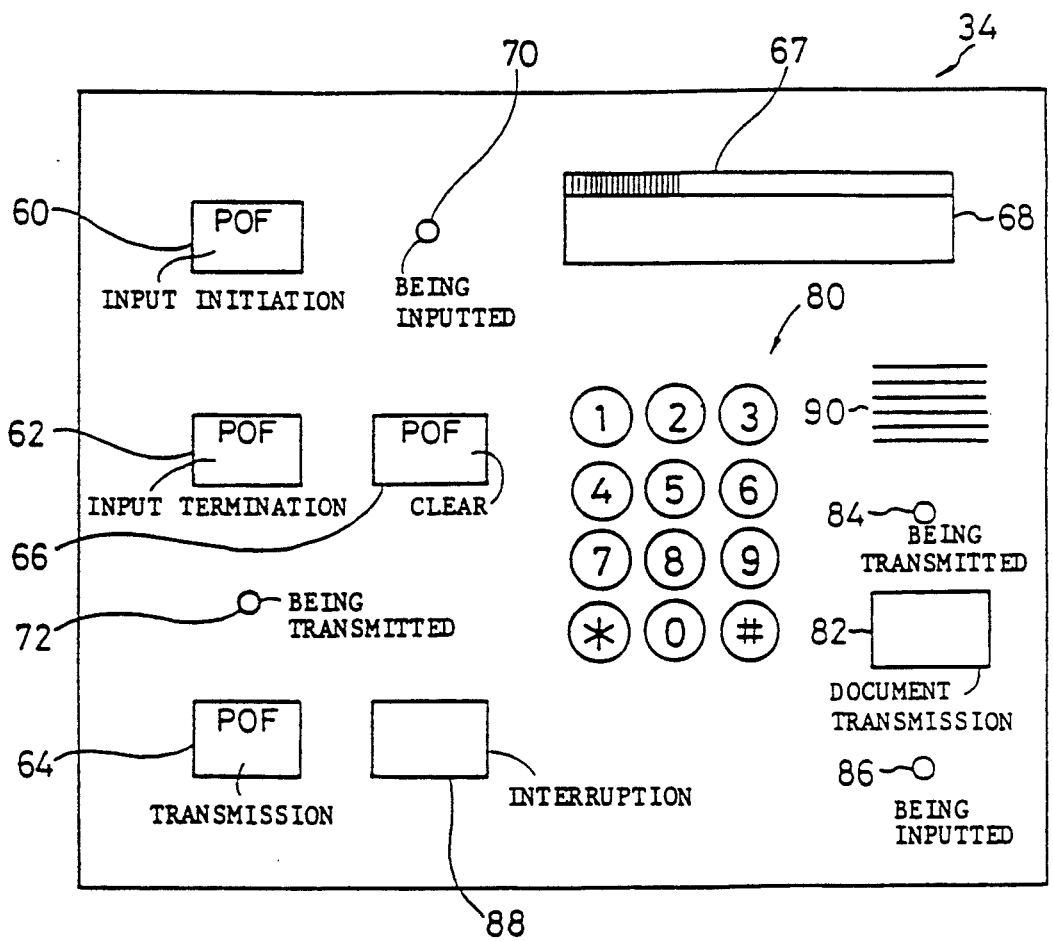
FIG. 2 is a schematic plan view of a panel of the facsimile system of FIG. 1.

Turning now to FIG. 2, there is shown a panel portion, which serves as a man-machine interface, of the facsimile system of FIG. 1. As shown in this figure, in addition to ten-keys 80, a transmission key 82, a transmission displaying light emitting diode (LED) 84, a reception displaying LED 86, an interruption key 88 and a buzzer 90, are provided therein a printer output file (POF) input commencing button 60, a POF input terminating button 62, a POF transmitting button 64, a POF clearing button 66, a liquid crystal display portion 68 which includes a liquid crystal bar portion 67 for displaying an inputted amount of the PFO and a transmitted amount of the PFO, a POF input displaying LED 70 and a POF transmission displaying LED 72.

Figure 3:
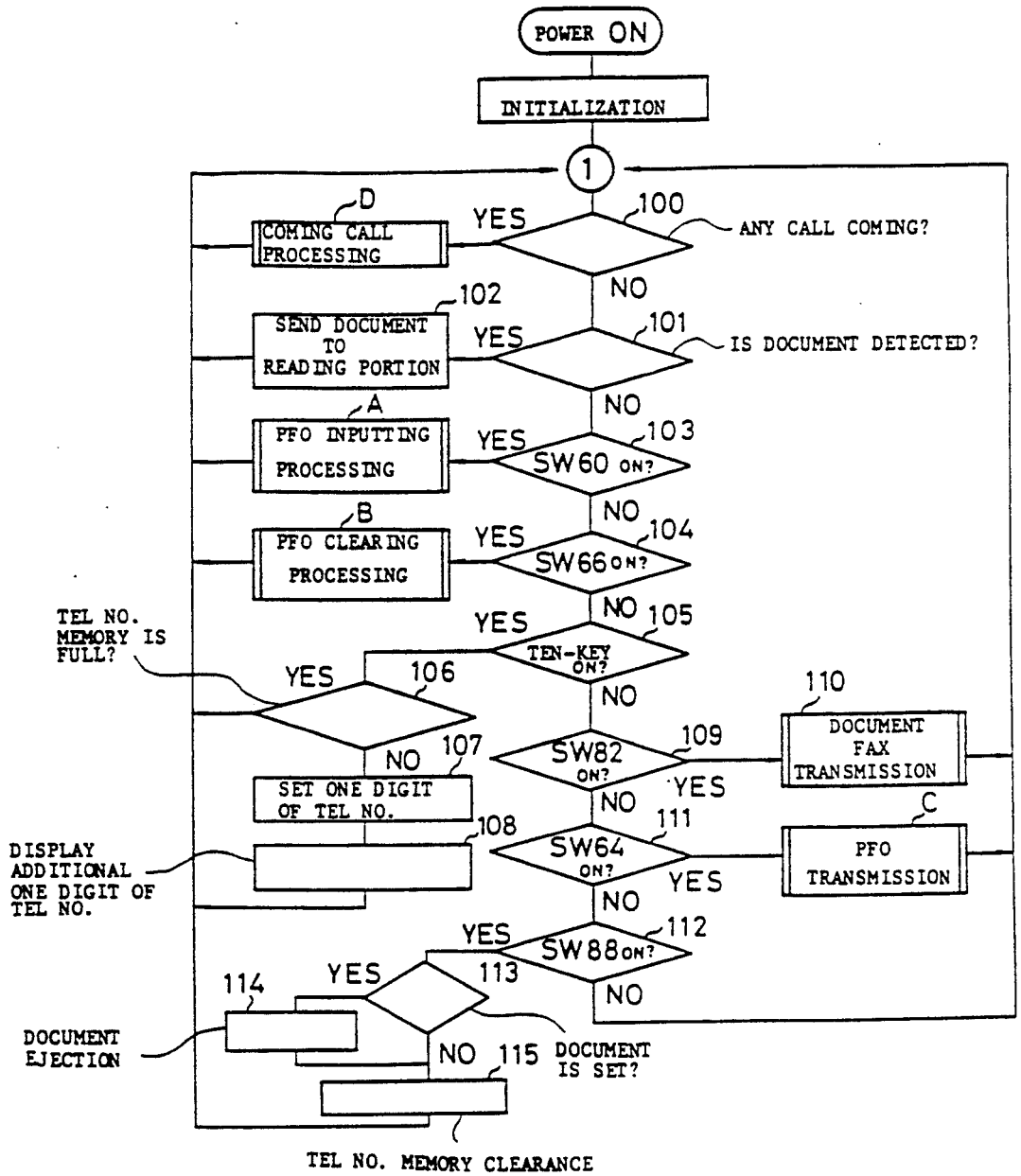
FIG. 3 is a flowchart for illustrating an outline of an operation of a microprocessor of the facsimile system of FIG. 1.

The microprocessor 40 of the facsimile system of FIG. 1 operates in accordance with a program stored in The ROM 42 of which the main routine is illustrated by a flowchart of FIG. 3. Further, FIGS. 4–8 and 10 are detail flowcharts for illustrating processes included in the main routine of FIG. 3. In the main routine of FIG. 3, when the power is turned on, the system is first initialized in a predetermined manner. Then, the program advances to step 100 whereupon it is determined whether or not a call incoming from another facsimile system to the network control portion 46 is present. If present, an incoming call processing routine D, which will be described in detail, is executed. If not, the program further advances to step 101 whereupon it is determined whether or not an original page of document describing the information to be transmitted is set in a predetermined document setting portion. If the document is set, a first page of the document is fed to the reading and scanning portion 10 in step 102. If not set, the program enters step 103 whereupon it is determined whether or not the input commencing button 60 is pressed. If pressed, a POF input processing routine A, which will be explained later, is executed. Incidentally, each button is represented by characters SW in the flowchart. In contrast, if not, the program advances to step 104 whereupon it is determined whether or not the POF clearing button 66 is pressed. If pressed, the POF clearing processing routine B, which will be described later, is executed. With the exception of both step 11 and a POF transmitting routine C, the subsequent steps are executed to input a telephone number of the destination and commence the transmission, similarly as in case of the conventional facsimile system. Further, in step 111, it is determined whether or not the POF transmitting button 64 is pressed. If pressed, the POF transmitting routine C, which will be explained later, is executed. Incidentally, in steps 106–108, the telephone number is stored in a memory and displayed on the panel by operating the ten-keys 80. Further, in steps 112–115, the original page of the document set in the document setting portion is ejected therefrom and the stored telephone number is cleared from the memory and at the same time the display of the telephone number is cleared when the interruption button is pressed.

Each of the routines A, B, C and D is characteristic of the facsimile system of the present invention. In each of the routines A, B, C and D, the following processing is effected.

(A) POF input processing is performed by executing the routine A. That is, the data to be outputted from the printer (hereunder referred to simply as a printer output data) are received from the document composition system composed of a word processor or a personal computer and are stored.

(B) POF clearing processing is performed by executing the routine B. That is, the POF, of which the transmission is terminated, is deleted.

(C) POF transmitting processing is performed by executing the routine C. That is, the stored document information is transmitted without being modified or after converted into ordinary facsimile signals according to the specification of the destination terminal.

(D) Incoming call processing is performed by executing the routine D. That is, in the destination terminal which receives the POF without change, the received POF is first stored in a random access memory (RAM) and then the document information is converted into image information by emulating an operation of a printer and further the converted information is outputted to recording paper.

Hereinafter, these four routines will be described in detail.

Figure 4:
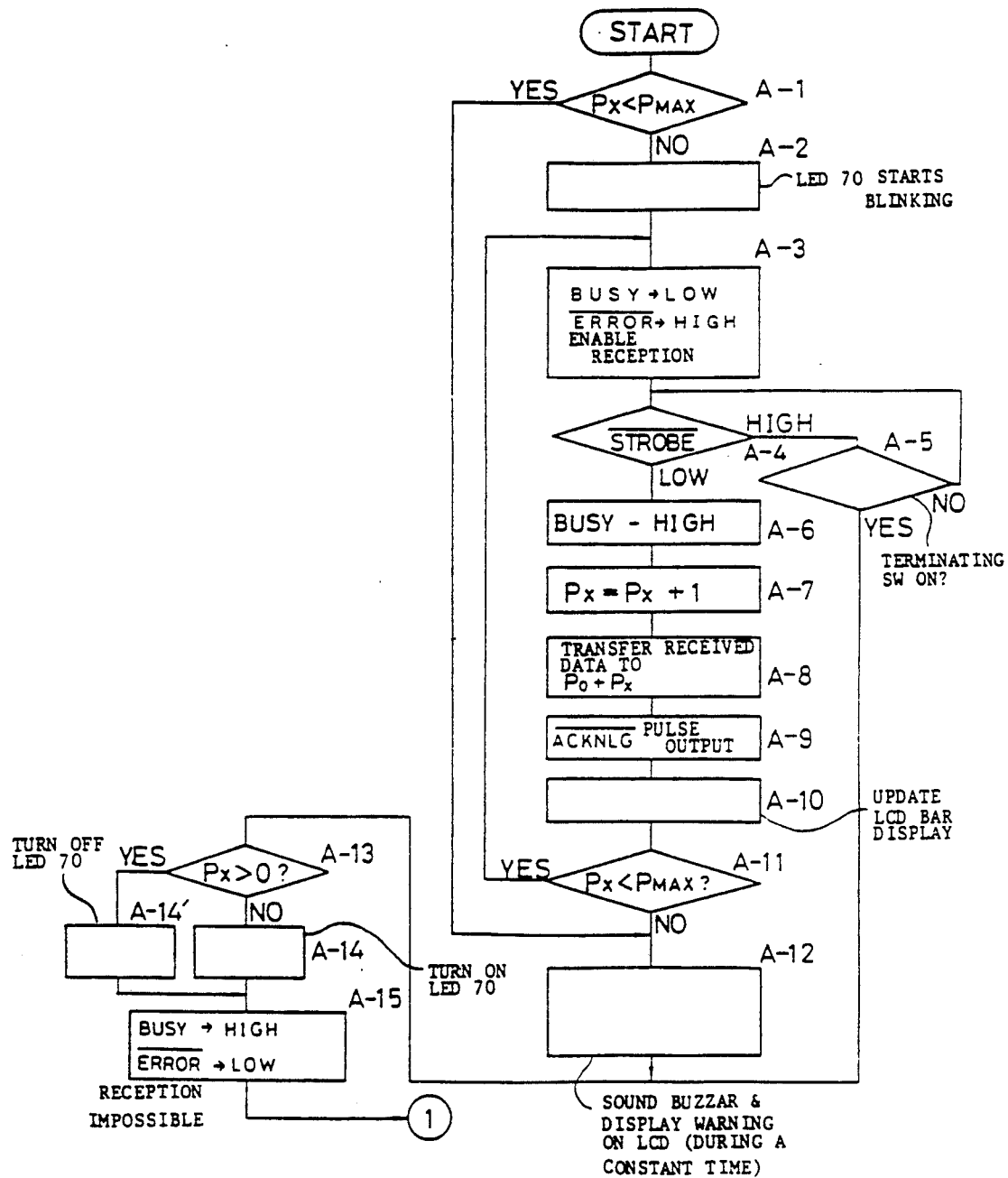
FIGS. 4, 5, 6A, 6B, 7, 8AS, 8B, 10A and 10B are detail flowcharts for illustrating principal processes of the flowchart of FIG. 3.
Figure 5:
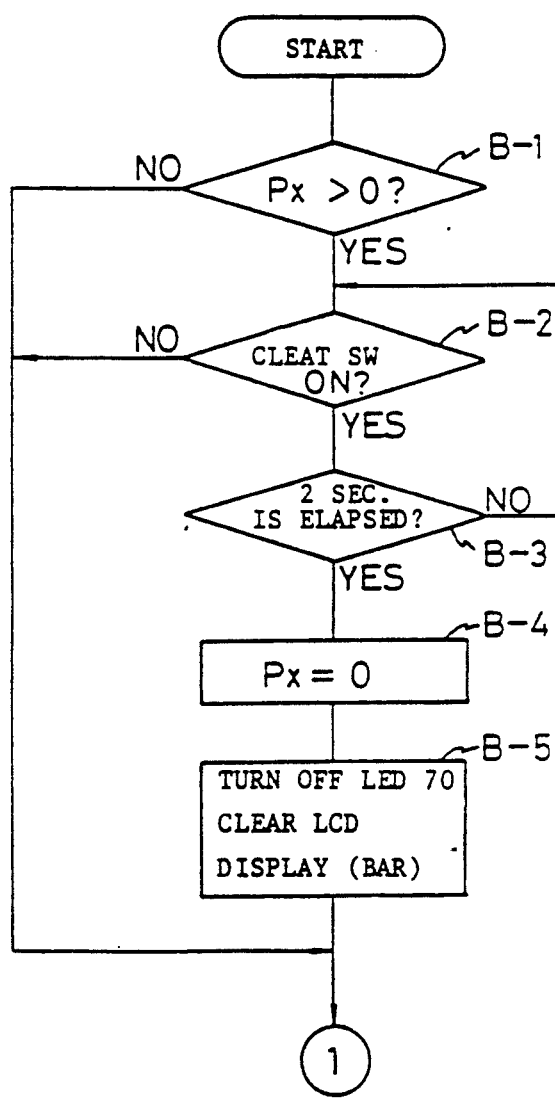

First, FIG. 4 is a flowchart of the routine A to be executed for performing the POF input processing.

In this routine, the data included in the the POF outputted as data to be supplied from the document composition system to a printer (not shown) are received and then stored in a RAM 38. Here, let $P_o$ denote a top or starting address of a storage area assigned in the RAM 38 for storing the data; Px the number of bytes, which are already used to store the data, in the assigned storage area; and Pmax the number of bytes (for example, several hundred k bytes), which are available for storing the data, of the assigned storage area. Incidentally, at the time of initialization. Px is set to be zero. Further, before initiating the processing, the size of a residual or unused storage area is checked in step A-1. If the size of the residual storage area is insufficient, the buzzer is turned on to sound a warning, and moreover predetermined information is displayed on the panel in step A-12. Thereafter, the program enters steps A-13 to A-15 and performs terminating processing.

If sufficient, the program enter step A-2 whereupon an LED 70 commences blinking for the purpose of indicating that the POF is being inputted. Thereafter, the system effects the POF input processing in steps A-3 to A-11. That is, in step A-3, an interfacing signal is put into a state in which the input of the POF is possible. Then, a strobe signal from the document composition system is waited in step A-4. When a pulse is inputted, input data represented by using 8 bits are transferred to the memory in steps A-7 and A-8. At that time, a handshake of data input is performed on the basis of a BUSY signal and an ACKNLG signal in steps A-6 and A-9. Further, the display 67 of an amount of the input file by an LCD bar is updated in step A-10.

Further, if it is checked and verified that the input terminating button 62 is turned on or pressed during the strobe signal is waited in step A-4, the terminating processing is effected. After the data is received by one byte, the amount of the residual memory is checked in step A-11 and further the program returns to step A-3 to continue the POF input. If the terminating processing is started by detecting the fact that there is no residual memory or that the input terminating button 62 is turned on, the LED 70 is turned on or off in response to the presence or the absence of the input data in steps A-13 and A-14. Thereafter, the terminating processing is finished by inhibiting the input of the POF and further the program returns to ①.

Next, the POF clearing processing will be described hereinbelow by referring to FIG. 4.

In the POF clearing routine, a file is deleted by letting the variable Px indicating the number of the stored bytes be 0. In order to prevent a file from being deleted by an operation mistake, in this embodiment, a loop consisting of steps B-2 and B-3 is formed, and, in step B-4, the deletion is performed only when the clearing button is kept pressed during two seconds. Upon completion of the deletion, the LED 70 indicating the presence of the input file is turned off and in addition the bar display 67 of the LCD 68 is cleared in step B-5.

Figure 6A:
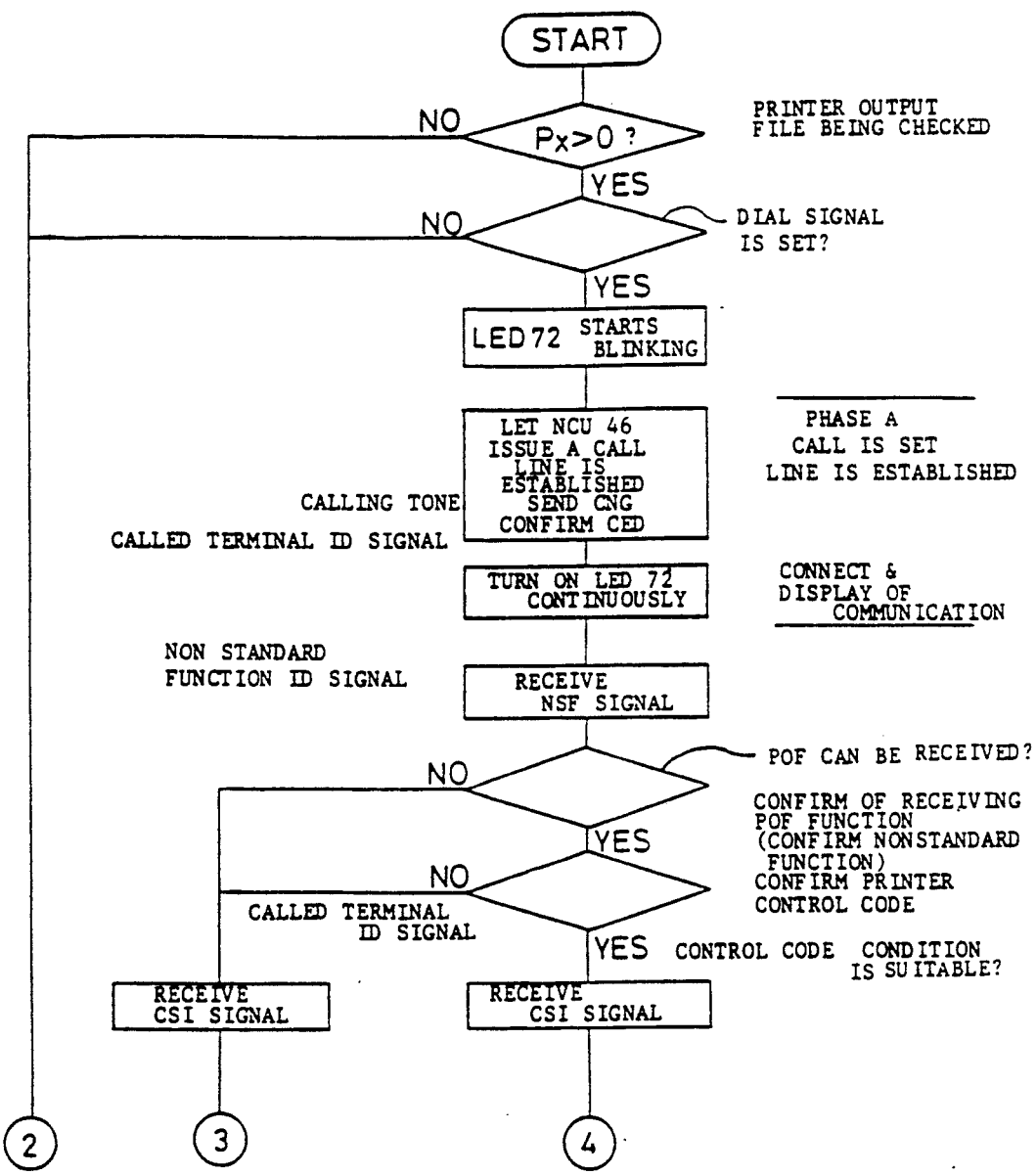

Further, the POF transmitting routine C will be described hereinafter by referring to FIGS. 6A and 6B.

The POF transmitting processing is the same with ordinary processing in the CCITT Group 3 facsimile prescribed in the CCITT Recommendation T.30 for the most part. Namely, in case of communicating with a facsimile system, in conformity with transmission control procedure prescribed in the CCITT T series Recommendation, are performed check of the states of terminals and transmission lines, terminal control, control of the system prior to and posterior to a message transmission, confirmation of an end of a message, confirmation of reception of a message and disconnection of a line.

The POF transmission is a nonstandard function other than standard functions defined in the CCITT T series Recommendation and thus requires a procedure different from the ordinary transmission control procedure. Further, it is necessary to determine whether or not the destination terminal has the POF receiving function and change the POF transmitting mode.

If there is no printer emulation program using the printer control code system employed by the transmitting portion, the POF should be transmitted in the POF image conversion transmission mode. Moreover, in case of the POF transmitted in the POF transmitting mode, effects of a transmission error are larger than in case of an ordinary facsimile signal. Thus, a transmission error correcting procedure is required at the time of a message transmission (that is, a transmission of the POF). It is a method of transmitting a facsimile message in a phase C that differs from the ordinary processing. The method of transmitting a facsimile message in a phase C in case where the called terminal has the POF receiving function of the present invention and the same printer control code system as the calling facsimile system does (that is, in case of executing a routine C') is different from that in case where the called terminal does not have the POF receiving function of the present invention or the same printer control code system as the calling facsimile system does (that is, in case of executing a routine C''). The receiving function and the printer control code system of the called terminal can be known from a nonstandard function identification (NSF) signal of a phase B.

The NSF signal has a hierarchical structure including ① national codes, ② maker codes and ③ function codes in accordance with CCITT specification. Here, the national codes are assigned by the CCITT to makers, and on the other hand the maker codes are assigned by a machinery of each nation in charge to makers, and further the function codes are defined by each maker individually.

In case where the called terminal can receive the POF (that is, in case of executing the routine C'), the POF is transmitted without change to the called terminal in accordance with a sequence of the ordinary phase C. At that time, compression processing (of only a type of reserving information) of the POF is performed and then the compressed POF is transmitted in an automatic error correction mode.

In contrast, in case where the POF cannot be transmitted without change (that is, in case of executing the routine C''), the POF is converted into image information by executing the printer emulation program stored in the ROM cartridge 56 and then the image information is transmitted to the called terminal as the contents of the ordinary facsimile message.

Figure 6B:
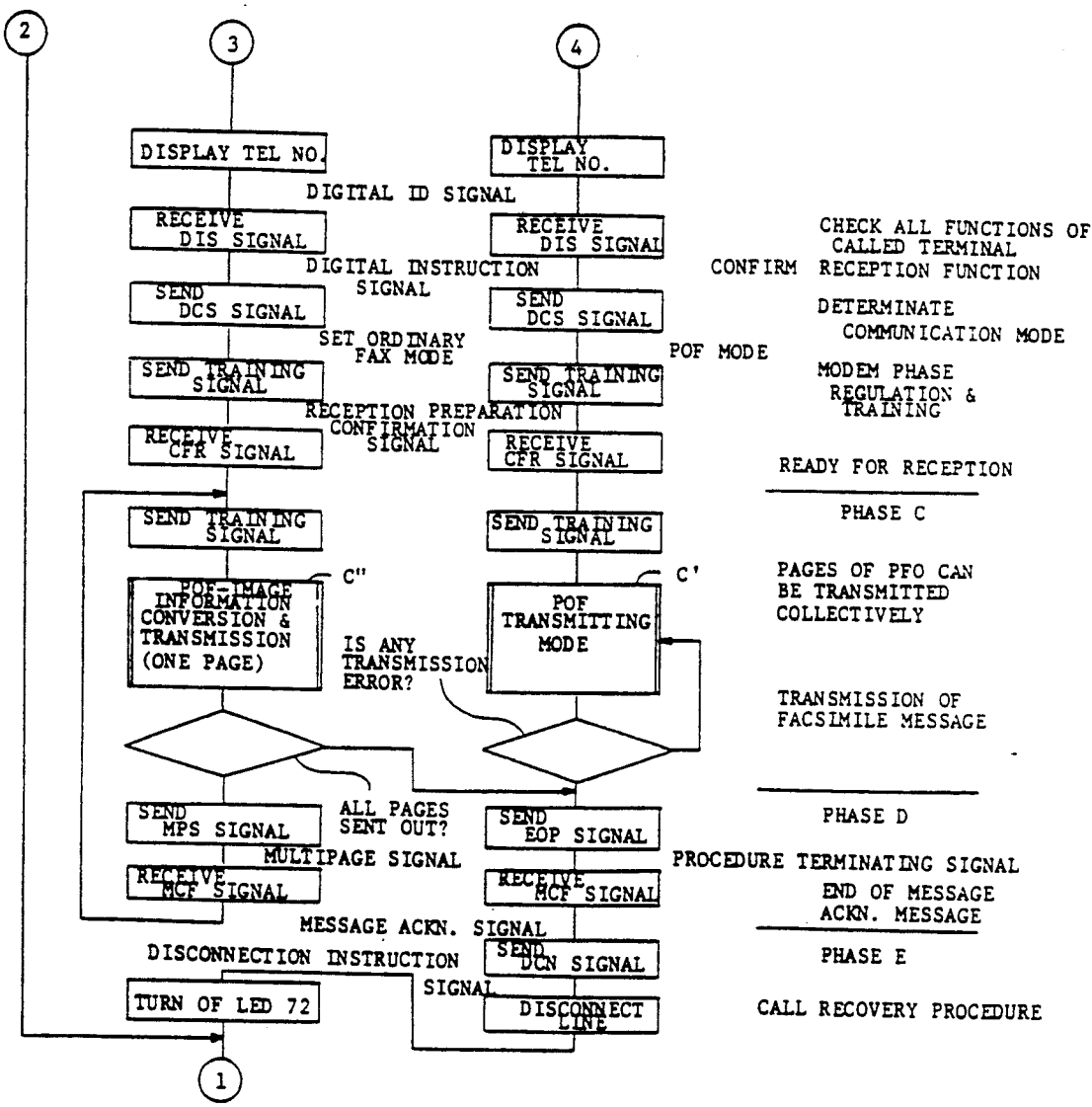
Figure 7:
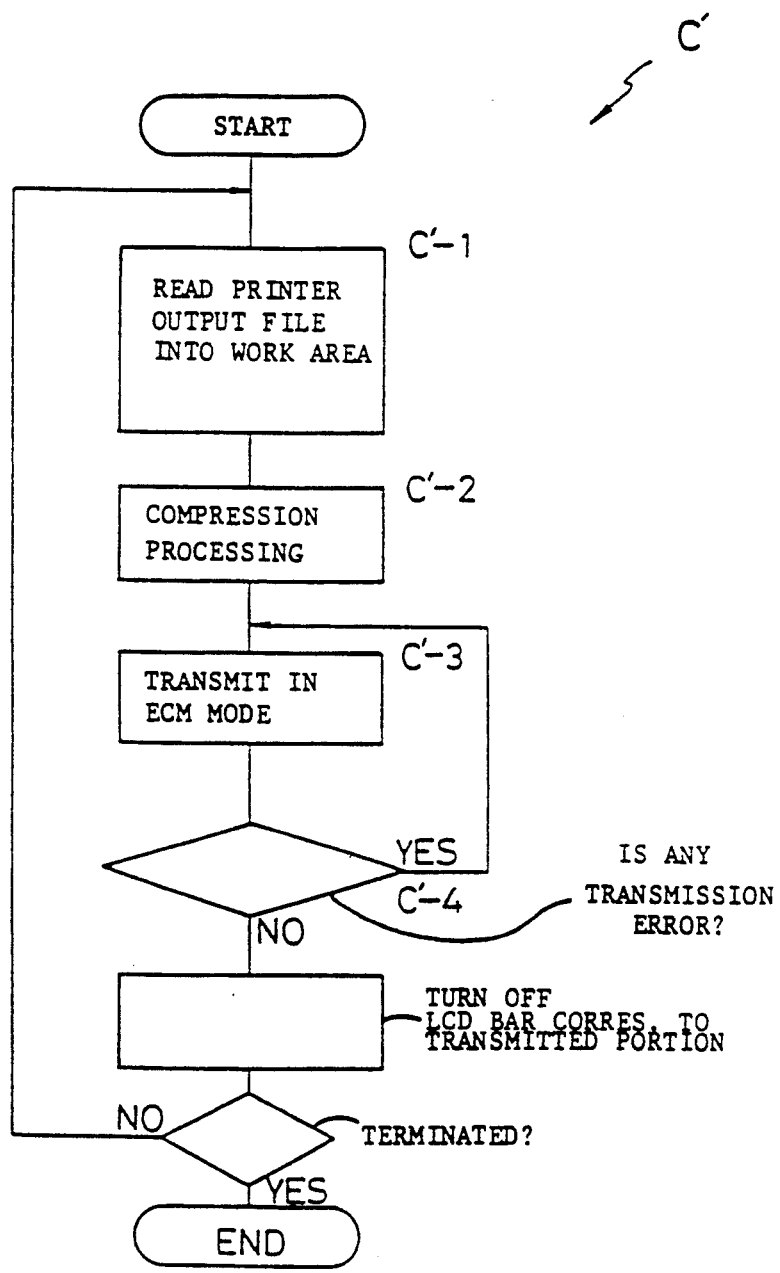
Figure 8A:
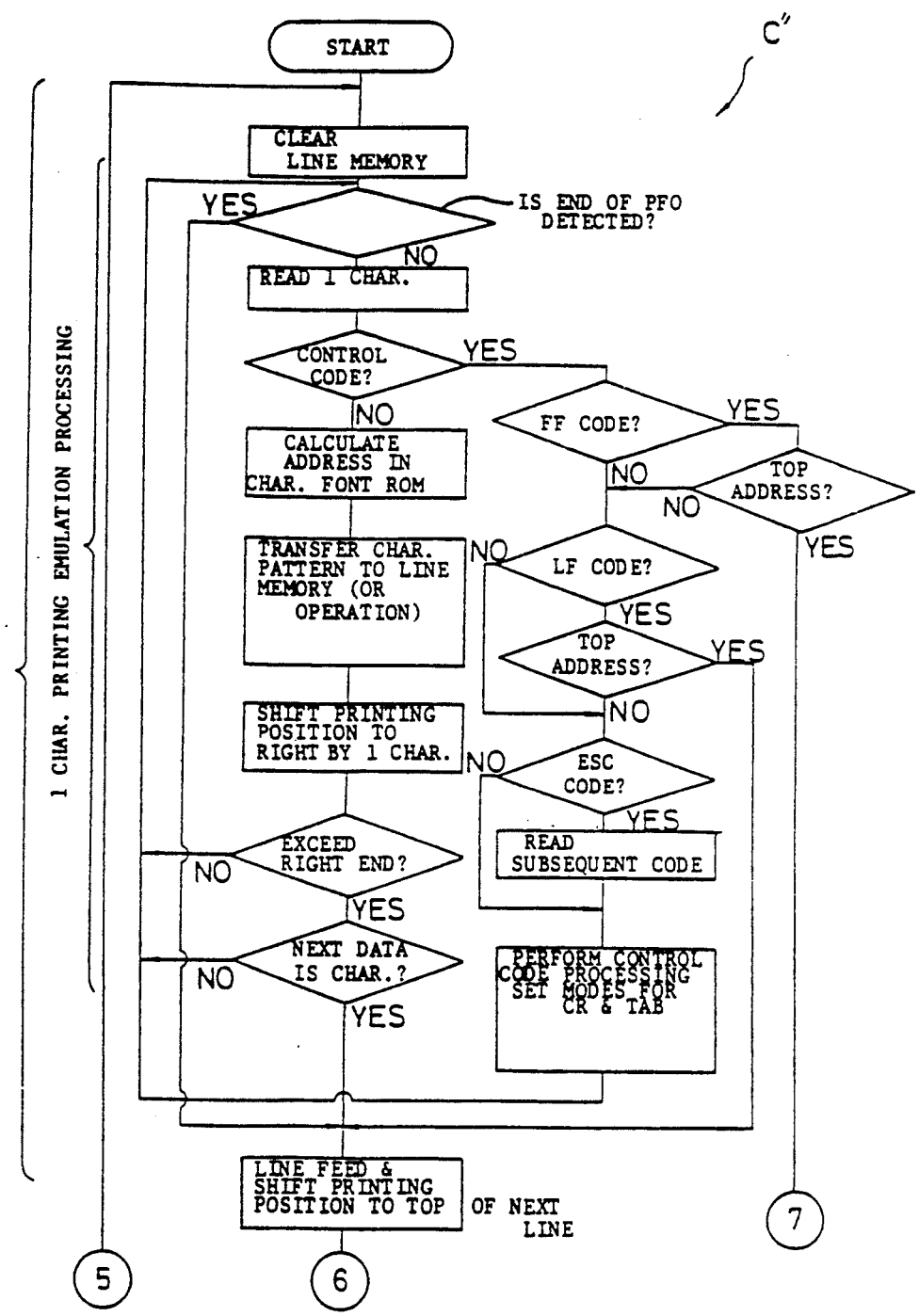
Figure 8B:
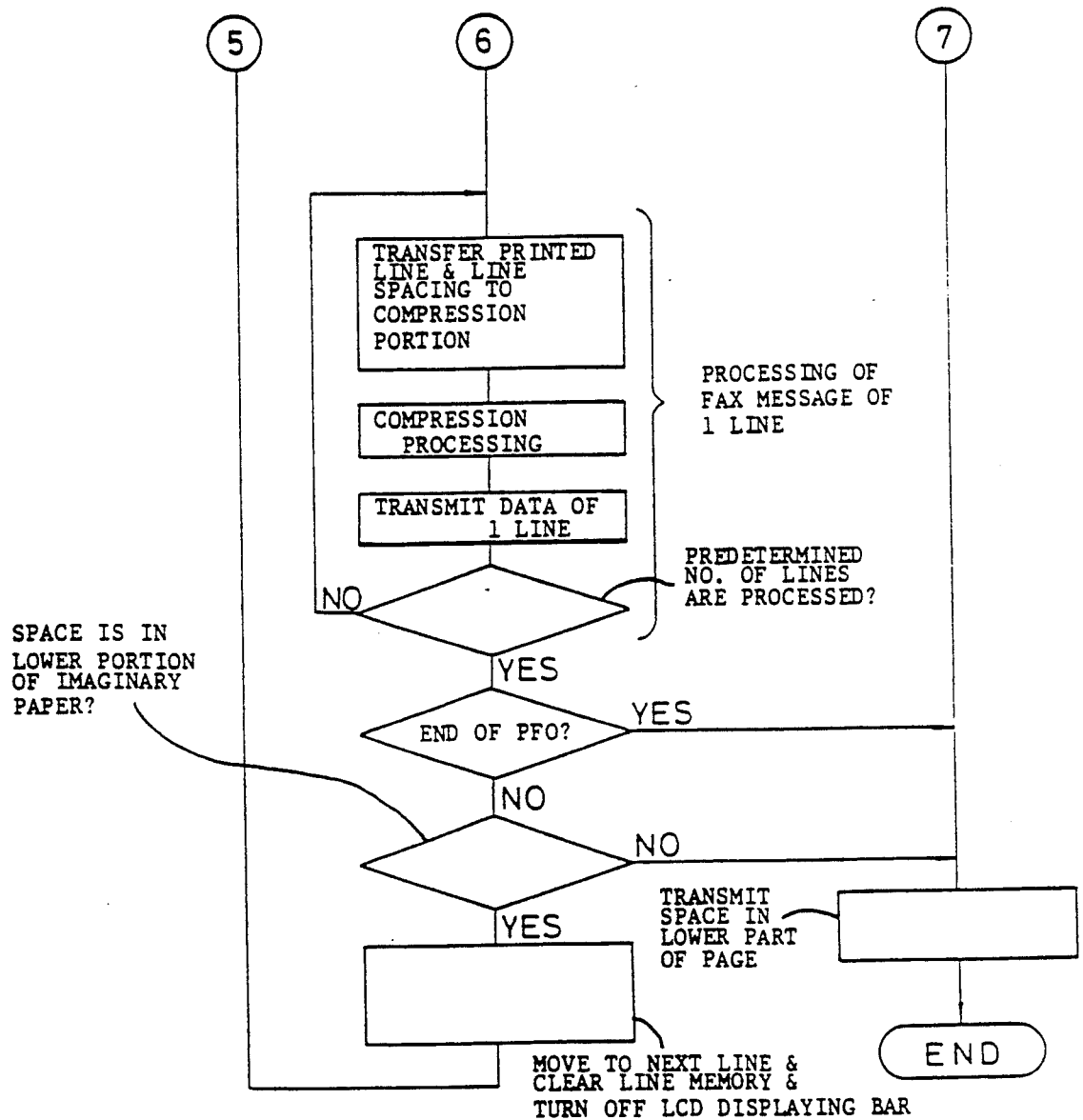

The POF transmitting routine C' of FIG. 6B is executed in case where the destination facsimile system has the POF receiving function and in addition the printer control code which is in agreement with that of the calling facsimile system, and is described in detail in FIG. 7.

As shown in this figure, the POF stored in the RAM 38 is compressed and then transmitted to the called terminal.

Further, the POF includes not only character codes but also printer control codes. Thus, the POF is exactly transmitted by using an automatic retransmission (ECM) function defined by the CCITT standards in steps C' -3 and C' -4.

The POF has a low redundancy and is compact in comparison with a facsimile message. Therefore, a plurality of pages of the POF can be collectively transmitted in one sequence of the phase C.

Thus, the present invention can considerably save transinformation (that is, the volume of information to be transmitted) by performing transmission of document information using character codes by transmitting a POF.

In case of an ordinary conventional facsimile system, it takes about one minute to transmit an A4 page of document. Strictly speaking, a time spent for transmitting the facsimile message is obtained as about 40 seconds by subtracting a time spent for preprocessing and postprocessing from one minute. Thus, assuming that the transmission speed, that is, the data transfer rate is 9600 bps, the transinformation of about 40 K bytes is transmitted.

In contrast with this, in case where the same document information is transmitted by using character codes, the transinformation can be only 4 K bytes or so and thus be one-tenth the transinformation transmitted in case of the ordinary conventional facsimile system even if the codes includes control codes for control of operations of, for example, carriage return, line feed and page ejection.

Thereby, the transmission time, as well as the transmission cost, can be considerably reduced. Further, the facsimile of the present invention is very advantageous especially in case of collectively transmitting a large number of pages of a newspaper, a magazine or the like.

Moreover, in comparison with a conventional case where document information is first printed out and then the printed page is transmitted by a facsimile system, the document transmitted and received by the facsimile of the present invention is far clearer. Further, the present invention can save the time and cost required for printing out the document information before the transmission of the printed page in the conventional case. Furthermore, it should be noted that when the document information is once printed out or outputted to a sheet of paper and then the photoelectric conversion of the printed page is effected by the facsimile system as in the conventional case, the picture quality is inevitably degraded. In contrast, in case of the facsimile of the present invention, the received page of the transmitted document is substantially as clear as the original page of the document transmitted in the POF transmitting mode and in the POF-to-image conversion transmission mode.

Furthermore, the facsimile system of the present invention can transmit document information including a photograph and a graphic form, which are printed by using what is called a bit-mapped image printing method, in addition to characters without modification. Additionally, as long as the printer control code system of the transmitting facsimile system is in agreement with that of the receiving facsimile system, the facsimile system of the present invention can transmit, receive and record picture information obtained from a photograph or graphic form by using a scanner or computer graphics without modification. However, in this case, the transinformation inevitably increases due to the addition of the graphic data having a high redundancy to the character data.

Further, the facsimile system of the present invention can be easily interfaced with the existing the document composition system. The printer control code system of the personal computers having a large market share is standardized, and there are only a few standard printer control code systems such as "ESC-P". If a ROM cartridge supporting at least one of these printer control code systems is used, most of personal computers can use the POF transmitting mode of the present invention.

As to software, it is intended by the facsimile system of the present invention to obtain software compatibility by outputting a file in accordance with the same printer control code system at the stage of printer output in view of difference in file format employed in various kinds of software. Thus, the facsimile system of the present invention can use outputs of substantially any software and has high software compatibility.

Further, there are various kinds of printer control code systems of printers dedicated to word processors. In this case, the POF transmitting mode of the present invention can be used by receiving a printer output file by an RS-232C interface by using communication facility.

Figure 9:
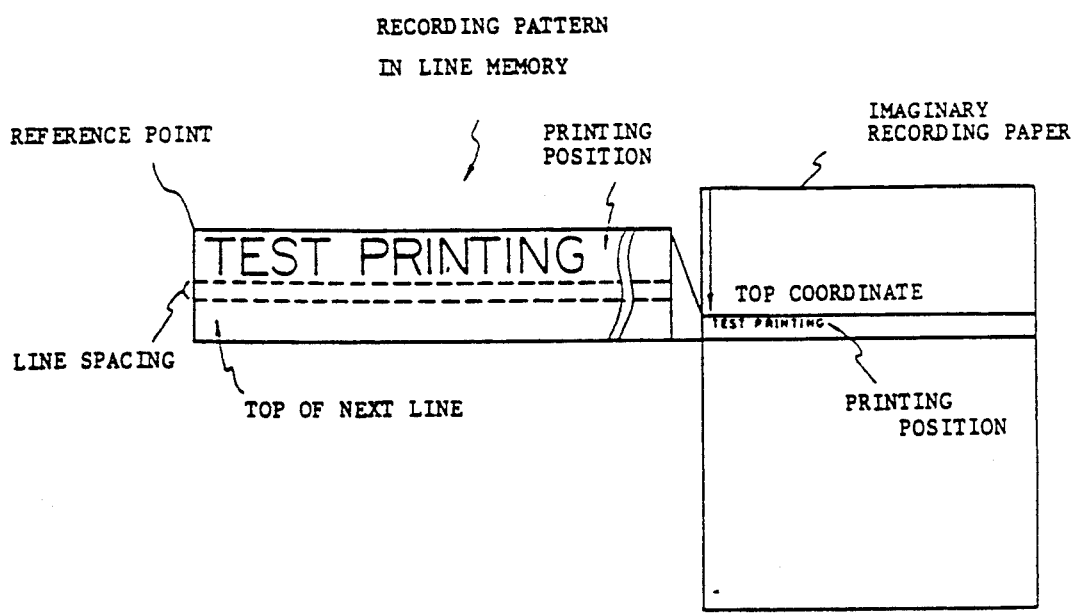
FIG. 9 is a diagram for illustrating operations of which flowcharts are shown in FIGS. 8A ad 8B.

On the other hand, the step C" of converting the printer output file to image information and transmitting the image information shown in FIG. 6B is executed when the destination facsimile system does not have the POF receiving function or when the printer control code system employed in the destination facsimile system is not in agreement with that of the transmitting system. The step C" is illustrated in detail by FIGS. 8A and 8B. Further, FIG. 9 shows imaginary recording paper and characters displayed thereon. In the left side of the imaginary paper, as viewed in this figure, is shown a character pattern recorded on a corresponding line of a line memory 16. Moreover, FIG. 9 illustrates emulation of a serial dot printer. A reference point in the line memory 16 is assumed to be a top address of a line, which is currently printed, on the imaginary recording paper, and thus the character pattern will be recorded in the line memory 16. Taking a double height size and a double height and width size character mode into consideration, the number of the lines is at least double the number of dots for character. Further, the emulation of an operation of a printet is to record the character pattern in the line memory 16 instead of actually operating printing pins. In order to enable an overprint, logical OR operations are effected in recording the character pattern. Upon completion of the emulation of a printing operation of one line, a portion of the line memory 16 corresponding to this line is compressed and then transmitted. Further, upon completion of the emulation of an operation of printing one line, the top address of a line to be printed in the imaginary recording paper is moved down by one line. Furthermore; the line memory 16 is cleared and then the position to be currently printed is adjusted to the reference point in the line memory 16.

After repetition of the above described operation, the POF-to-image conversion and transmission processing of one page by emulating a printing operation of a printer is terminated by detecting, for instance, (i) an end of the POF, (ii) no space in the imaginary recording paper and (iii) an effective page ejection or FF code.

Figure 10A:
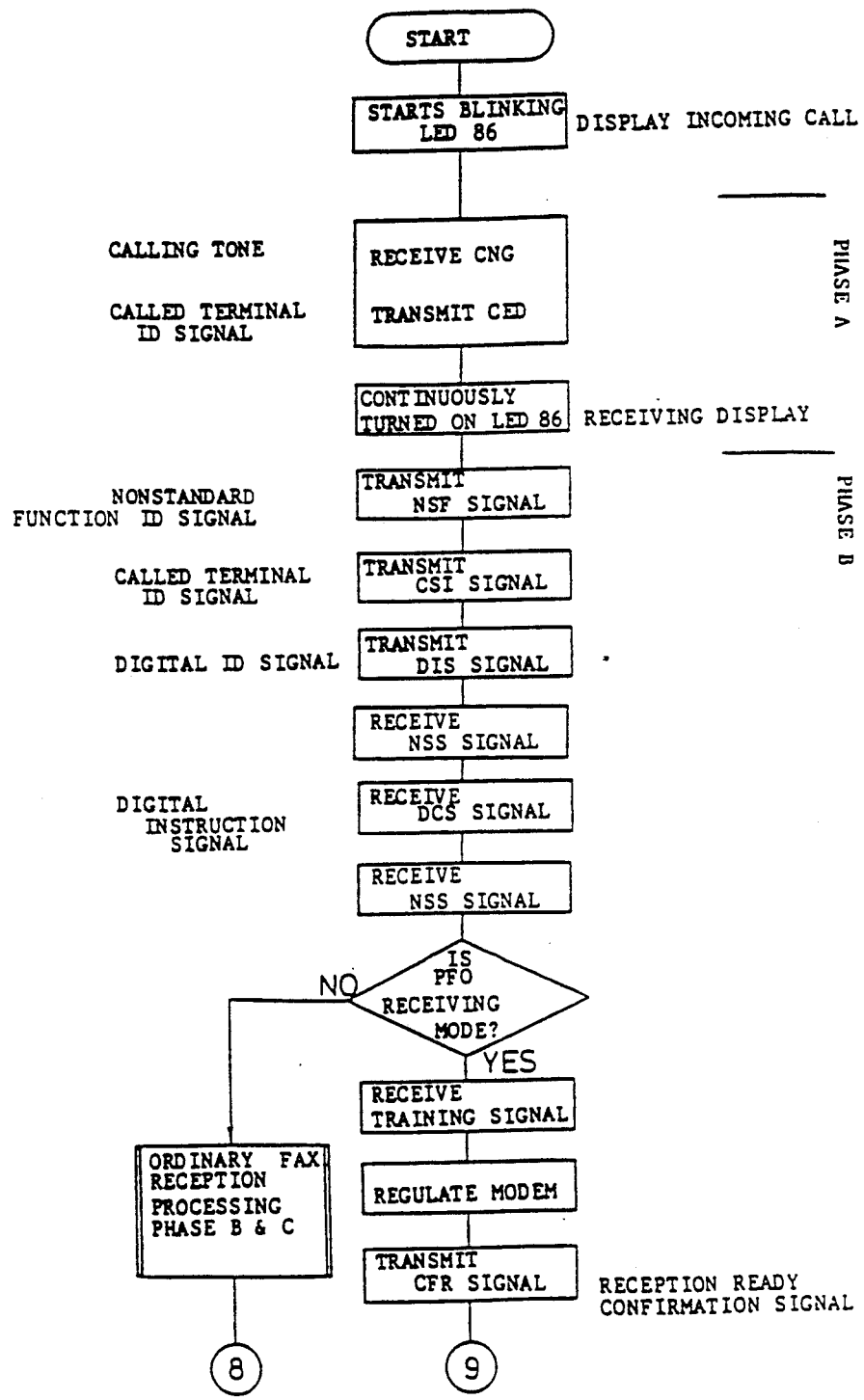
Figure 10B:
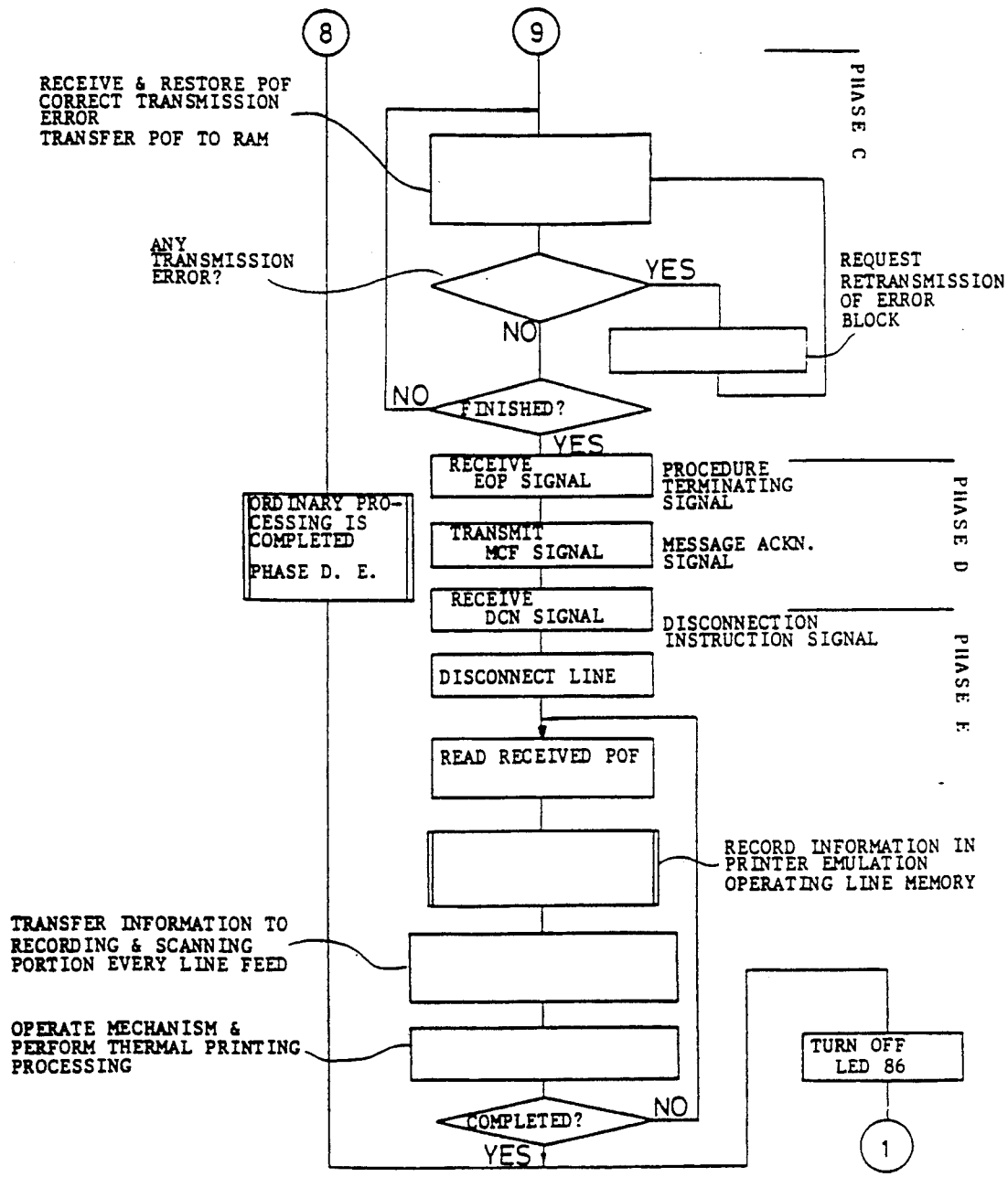

Next, the incoming call processing routine D will be described hereinafter by referring to FIGS. 10A and 10B.

A sequence of the incoming call processing is performed in accordance with the recommendation by the CCITT. The processing of receiving the information transmitted by the transmitting terminal in an ordinary facsimile mode is quite the same with the reception processing by the ordinary Group 3 facsimile system. Further, when the POF transmitted in the POF transmitting mode is received, restoration processing and error correction processing of the received POF are performed and then the POF is transferred to a RAM and stored therein. An storage area for storing the received POF is establixhed in a region different from the storage area for recording the POF at the time of the transmission thereof. Upon completion of the receiving processing, the received POFs are serially read, and then the emulation of the printing operation of the printer is effected and the POFs are scanned and further recorded in the recording paper. Such processing is the same with the emulation processing effected at the time of performing the POF-to-image conversion and transmission processing with the exception that document image of one line recorded in the memory 16 is transferred to a recording processing portion 12 without modification and that the document image is scanned and recorded line by line. Further, the emulation of the printing operation of the printer in this case is the same with that effected in the above described POF-to-image conversion and transmission processing routine C" with the exception that the compression processing is not effected and the POF is outputted without modification to the recording processing portion 12 and then recorded therein.

In the above described embodiment, the parallel port constructed in accordance with the Centronics standard is used as the printer interface 50. In addition to this, a serial interface constructed in accordance with the RS-232C standard and so forth may be provided in this embodiment.

Further, along with this serial interface, is provided on the panel a text file reception initiating switch for initiating the reception of data through the serial interface.

Moreover, a control program for receiving the next file and recording the text file in the RAM 38, as well as a conversion program for converting the text file into the POF, is stored in the ROM 42.

A large number of the latest document composition systems are provided with a serial interface used for online communication. Generally, such document composition systems have a function of communicating document information including layout information, graphic information and image information without modification to another system of the same type and a function of communicating only character information to another system treating different data structure.

In case of communicating only character information, are employed in the system a character code list and a standard file (called as a text file) composed of control codes for carriage return and line feed and so on.

If the facsimile system of the present invention accepts the text file by using the serial interface in this way, the facsimile system of the present invention can accept document information from and transmit document information to a document composition system having another different printer code system.

The detail of the text file input processing is basically the same with the above described POF input processing, but a different interfacing signal is used.

After the text file input processing is terminated, the POF conversion processing including the following processing is effected.

First, to provide space or blank at the upper, lower, left and right portions of the recording paper, control codes for setting formats, that is, control codes for setting "right margin" and for setting "left margin" and for setting "perforation skip".

In case where the text file includes kanji data, kanji codes are converted into the printer code system and then a control code for establishing and terminating a kanji mode is added to just prior to and posterior to a sequence of kanji.

When the above described processing is terminated, the facsimile system of the present invention falls into the same state obtained at the time of the termination of the POF receiving processing. Thus, the facsimile system of the present invention can transmit document information to another facsimile system by using the procedure similar to the above described example.

Further, the facsimile system of the present invention can treat document information described by the PDL indicating a postscript and so on in addition to the above described POF and the text files.

Further, the facsimile system of the present invention may accept document information described by the PDL and treat the document information by using a PDL interpreter at the time of converting the document information to image information and use a laser beam printer at the time of outputting the information to the recording paper.

In this case, a mass page memory is required instead of a line memory. Other fundamental operations are the same with the operations in case of treating the above described POF.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A facsimile system having a transmitting function in facsimile communication, comprising:
   a first means for inputting externally generated electrical signals representing a printer output file for document data, the printer output file including character codes and control codes;
   a storage means for storing said printer output file for the document data represented by the externally generated signals inputted by said first means;
   a judging means for determining whether or not a destination facsimile system has a predetermined receiving function and whether or not a destination printer control code associated with said predetermined receiving function of the destination facsimile is in agreement with a source printer control code defined by said printer output file; and
   a second means for transmitting said printer output file stored in said storage means to said predetermined destination facsimile system by way of a communication line in accordance with a protocol of facsimile transmission.

2. A facsimile system having a transmitting function in facsimile communication, comprising:
   a first means for inputting external document data in the form of the electrical signals as a printer output file;
   a storage means for storing, as said printer output file, the external document data inputted by said first means;
   a second means for transmitting the external document data stored in said storage means as said printer output file to a predetermined destination facsimile system in the form of said printer output file by way of a communication line in accordance with a protocol of facsimile transmission;
   a judging means for determining whether or not the destination facsimile system has a predetermined receiving function and whether or not destination printer control code associated with said predetermined receiving function of the destination facsimile system is in agreement with a source printer control code defined by said printer output file;
   character font storing means for preliminarily storing character fonts;
   conversion means for converting the printer output file stored by said storage means into image information by reading the character fonts from said character font storing means in accordance with the external document data stored in said storage means;
   protocol conversion means for performing printer emulation of said external document data stored by said storage means in response to a determination that the destination facsimile system does not have the predetermined receiving function or that the printer control code of the destination facsimile system is not in agreement with the printer control code defined by said printer output file; and
   third means for transmitting the data converted into the image information to the destination facsimile system through the communication line in accordance with the protocol of the facsimile transmission.

3. The facsimile system as set forth in claim 2 wherein said printer output file includes character codes and control codes.

4. A facsimile system having a function of receiving document information sent from another facsimile system having a function of storing external document data in the form of electrical signals as a printer output file, and a function of transmitting the external document data to a predetermined destination facsimile system in the form of said printer output file in accordance with a protocol of facsimile transmission, said facsimile system including:
   a character font storing means for preliminarily storing character fonts;
   judging means for determining, through negotiation with said another facsimile system, as to whether or not signals to be received from said another facsimile system connected through a communication line thereto is document data as a printer output file;

signal receiving and storing means for receiving and storing the signals sent from said another facsimile system; and conversion means, responsive to said judging means, for converting, when said signal to be received is determined as a printer output file by said judging means through said negotiation, the printer output file into the image information by reading the character fonts from said character font storing means in accordance with the stored signals representing the document data and performing printer emulation at the same time.

5. A facsimile communication method comprising the steps of:

storing externally generated electrical signals representing a printer output file for document data, the printer output file including character codes and control codes;

judging whether or not a destination facsimile system has a predetermined receiving function and whether or not a destination printer control code associated with said predetermined receiving function of the destination facsimile system is in agreement with a source printer control code defined by said printer output file;

transmitting said printer output file to said destination facsimile system in accordance with a protocol of facsimile transmission when it is judged in the above step that said destination facsimile system has said predetermined receiving function and that said destination printer control code is in agreement with said source printer control code;

receiving said printer output file at said destination facsimile system;

converting the received printer output file by reading character fonts preliminarily stored in a character font storing means in the predetermined destination facsimile system and simultaneously performing emulation of a printing operation of a printer to supply image information; and printing the image information.

6. A facsimile system having a transmitting function in facsimile communication, comprising:

a first means for inputting external document data in the form of electrical signals as a printer output file which includes character codes and printer control codes;

a storage means for storing, as said printer output file, the external document data inputted by said first means; and a second means for transmitting the external document data stored in said storage means as said printer output file to a predetermined destination facsimile system in the form of said printer output file by way of a communication line in accordance with a protocol of facsimile transmission.

7. A facsimile communication method comprising the steps of:

storing external document data in the form of electrical signals as a printer output file which includes character codes and printer control codes;

transmitting the printer output file to a predetermined destination in accordance with a protocol of facsimile transmission;

receiving said printer output file at said destination;

converting the received printer output file by reading character fonts preliminarily stored in a character font storing means in the predetermined destination and simultaneously performing emulation of a printing operation of a printer to supply image information; and printing the image information.

* * * * *

UNITED STATES PATENT AND TRADEMARK OFFICE
CERTIFICATE OF CORRECTION

PATENT NO. : 5,268,770
DATED : December 7, 1993
INVENTOR(S) : Kensaku YUKINO

It is certified that error appears in the above-indentified patent and that said Letters Patent is hereby corrected as shown below:

Column 1, line 23, change "advantage" to --disadvantage--.

Column 2, line 1, change "through" to --though--;
line 21, after "information" insert --by facsimile--.

Column 4, line 9, after "not" insert --have--;
line 61, after "means" insert the following paragraphs:

--as a printer output file, then transmitting the external document data to a predetermined destination in accordance with a protocol of facsimile transmission, and, in the destination, converting the external document data into image information by reading character fonts preliminarily stored in a character font storing means in accordance with the received external document data and by simultaneously performing printer emulation and then printing the image information.

As is apparent from the foregoing description, in case of the facsimile system or the facsimile communication method of the present invention, only by adding the function of inputting and transmitting the

UNITED STATES PATENT AND TRADEMARK OFFICE
CERTIFICATE OF CORRECTION

PATENT NO. : 5,268,770
DATED : December 7, 1993
INVENTOR(S) : Kensaku YUKINO

It is certified that error appears in the above-indentified patent and that said Letters Patent is hereby corrected as shown below:

printer output file to the conventional facsimile system, a widespread facsimile network can be used and further document data can be transmitted by performing a simple operation as character codes. That is, the document data produced by the document composition system can be easily transmitted and received by performing an operation simpler than of the conventional personal computer communication. Furthermore, the facsimile system of the present invention has an advantage that an extremely large number of terminals can be communicated therewith. Moreover, various functions such as a broadcasting function and an interchanging function of the facsimile are available.--

Column 5, lines 19-45, delete from "as a" through "are available.".
   Column 6, line 4, change "8AS" to --8A--;
            line 68, change "PFO" to --POF--.
   Column 7, line 1, change "PFO" to --POF--;
            line 52, change "from" to --to--.

UNITED STATES PATENT AND TRADEMARK OFFICE
CERTIFICATE OF CORRECTION

PATENT NO. : 5,268,770
DATED : December 7, 1993
INVENTOR(S) : Kensaku YUKINO

It is certified that error appears in the above-indentified patent and that said Letters Patent is hereby corrected as shown below:

Column 8, line 10, delete "the" (second occurrence).

Column 11, line 57, change "printet" to --printer--;

line 67, change "Furthermore;" to --Furthermore,--.

Column 12, line 22, change "An" to --A--;

line 23, change "establixhed" to --established--.

Signed and Sealed this

Fifth Day of July, 1994

Attest:

BRUCE LEHMAN

*Attesting Officer*     *Commissioner of Patents and Trademarks*